(12) United States Patent
Imamura

(10) Patent No.: US 11,841,050 B2
(45) Date of Patent: Dec. 12, 2023

(54) LINEAR GUIDE

(71) Applicant: SMC CORPORATION, Tokyo (JP)

(72) Inventor: Masaki Imamura, Moriya (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/656,046

(22) Filed: Mar. 23, 2022

(65) Prior Publication Data
US 2022/0316526 A1    Oct. 6, 2022

(30) Foreign Application Priority Data

Apr. 2, 2021   (JP) ................... 2021-063426

(51) Int. Cl.
*F16C 33/66*    (2006.01)
*F16C 29/06*    (2006.01)

(52) U.S. Cl.
CPC ........ F16C 33/6648 (2013.01); F16C 29/063 (2013.01); F16C 29/0609 (2013.01)

(58) Field of Classification Search
CPC .. F16C 29/0609; F16C 29/063; F16C 33/103; F16C 33/6611; F16C 33/6648
See application file for complete search history.

(56) References Cited

U.S. PATENT DOCUMENTS

| | | | |
|---|---|---|---|
| 6,401,867 B1 | 6/2002 | Michioka et al. | |
| 6,517,244 B2 * | 2/2003 | Ishihara | F16C 29/06 384/13 |
| 7,614,790 B2 * | 11/2009 | Liu | F16C 33/664 184/5 |
| 8,251,586 B2 * | 8/2012 | Kondo | F16C 29/0635 184/5 |
| 2006/0102427 A1 * | 5/2006 | Wu | F16C 33/6648 184/5 |

FOREIGN PATENT DOCUMENTS

| | | |
|---|---|---|
| CN | 102434585 B | 10/2014 |
| DE | 10 2007 023 182 B4 | 4/2009 |
| JP | 2001-41305 A | 2/2001 |
| JP | 2005-337451 A | 12/2005 |

OTHER PUBLICATIONS

Extended European Search Report dated Sep. 2, 2022 in European Patent Application No. 22165330.6, 9 pages.
Office Action dated Jul. 11, 2023, in Japanese Patent Application No. 2021-063426, with English-language translation.

* cited by examiner

*Primary Examiner* — James Pilkington

(74) *Attorney, Agent, or Firm* — Oblon, McClelland, Maier & Neustadt, L.L.P.

(57) ABSTRACT

A return cover provided with a ball circulation path is attached to a slider, a lubricant retainer made up from a porous elastic body and in sliding contact with a guide rail of a body is supported by the return cover, and the lubricant retainer is provided therein with a lubricant storage space filled with lubricant.

7 Claims, 8 Drawing Sheets

LINEAR GUIDE

CROSS-REFERENCE TO RELATED APPLICATIONS

This application is based upon and claims the benefit of priority from Japanese Patent Application No. 2021-063426 filed on Apr. 2, 2021, the contents of which are incorporated herein by reference.

BACKGROUND OF THE INVENTION

Field of the Invention

The present invention relates to a linear guide having lubricant to be supplied to a guide rail.

Description of the Related Art

Conventionally, there has been known a linear guide in which a slider driven by an actuator is supported on a body via rolling elements such as balls. For example, JP 2001-041305 A discloses an actuator that rolls and circulates a plurality of balls between a base and a slider driven by a motor.

There is also known such a linear guide having a structure for supplying lubricant to a guide rail serving as a rolling surface for a rolling element. For example, an actuator disclosed in JP 2001-041305 A includes a ball return member constituting a part of a circulation path for a plurality of balls. A lubricating oil supply unit containing a lubricating oil-containing polymer member is attached to the ball return member.

SUMMARY OF THE INVENTION

However, there is a limit to the amount of lubricant impregnated into the lubricant-containing member. In the conventional linear guide, when all of the lubricant impregnated in the lubricant-containing member is consumed, supply of the lubricant to the guide rail is stopped. Therefore, maintenance such as replacement of the lubricant-containing member is necessary.

The present invention has the object of solving the aforementioned problems.

The linear guide according to the present invention has a configuration in which a plurality of balls are arranged between a guide rail of a body and a guide rail of a slider, and a return cover including a ball circulation path is attached to the slider. A valve retainer made up from a porous elastic body and being in a sliding contact with the guide rail of the body is supported by the return cover, and a lubricant retainer has a lubricant storage space filled with a lubricant inside.

According to the linear guide, each time the lubricant in the lubricant retainer is consumed, the lubricant retainer is replenished with the lubricant filled in the lubricant storage space. Therefore, the lubricant can be supplied to the guide rail of the body over a long period of time.

Since the lubricant retainer of the linear guide according to the present invention includes therein the lubricant storage space filled with the lubricant, a state in which the lubricant retainer is sufficiently impregnated with the lubricant is maintained over a long period of time, and the lubricant can be continuously supplied to the guide rail of the body.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

In the following description, when the terms in relation to the up, down, left, and right directions are used, for the sake of convenience, such terms refer to the directions shown in FIG. 1. However, the actual arrangement of the respective component members is not necessarily limited to this feature.

First Embodiment

A linear guide 10 according to a first embodiment of the present invention will be described with reference to FIGS. 1 to 6. The linear guide 10 includes a body 12 to which a drive source (not shown) such as an air cylinder or an electric motor is attached, and a slider 18 that is linearly reciprocated by the drive source.

Figure 1:
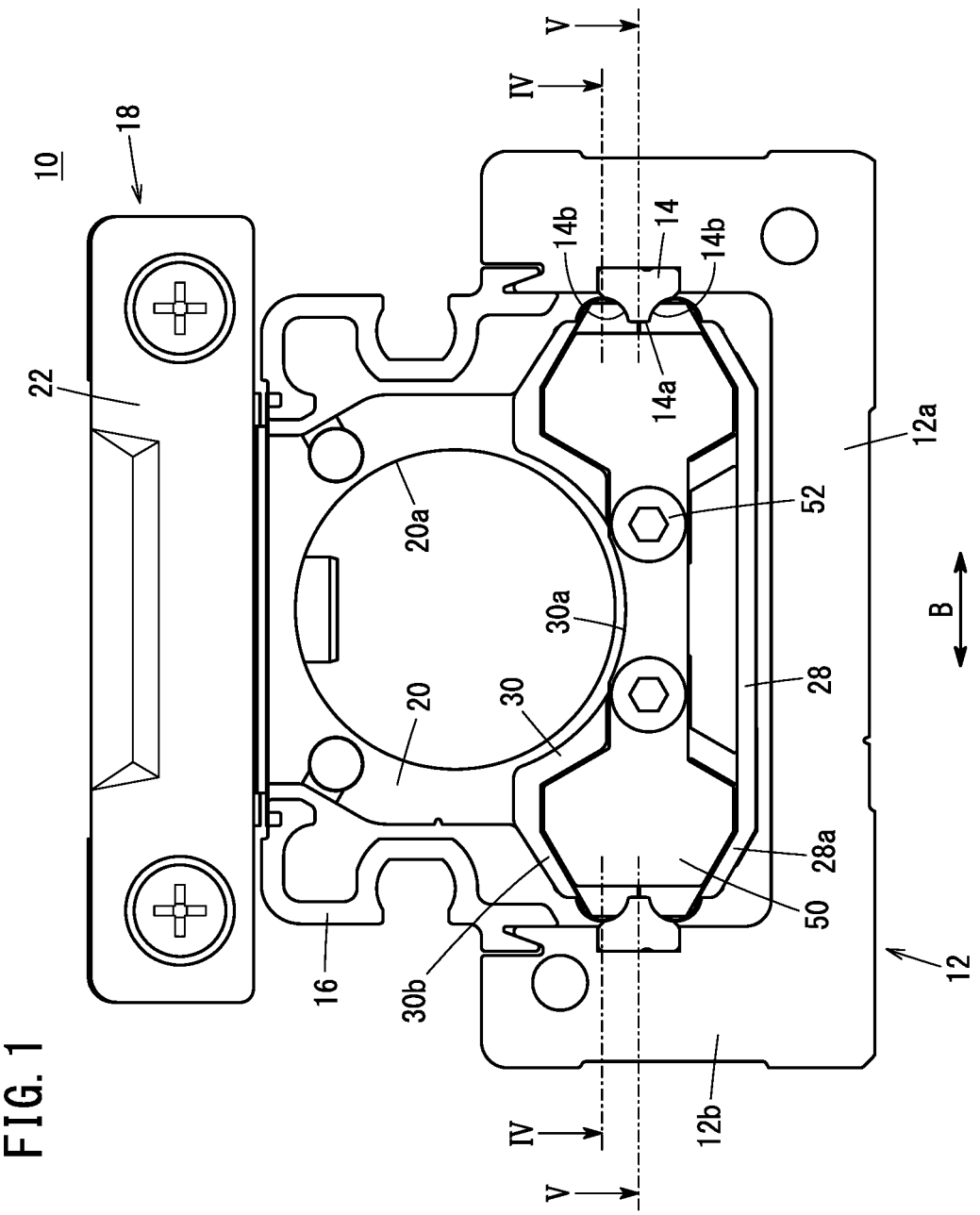
FIG. 1 is a front view of a linear guide according to a first embodiment of the present invention.
Figure 2:
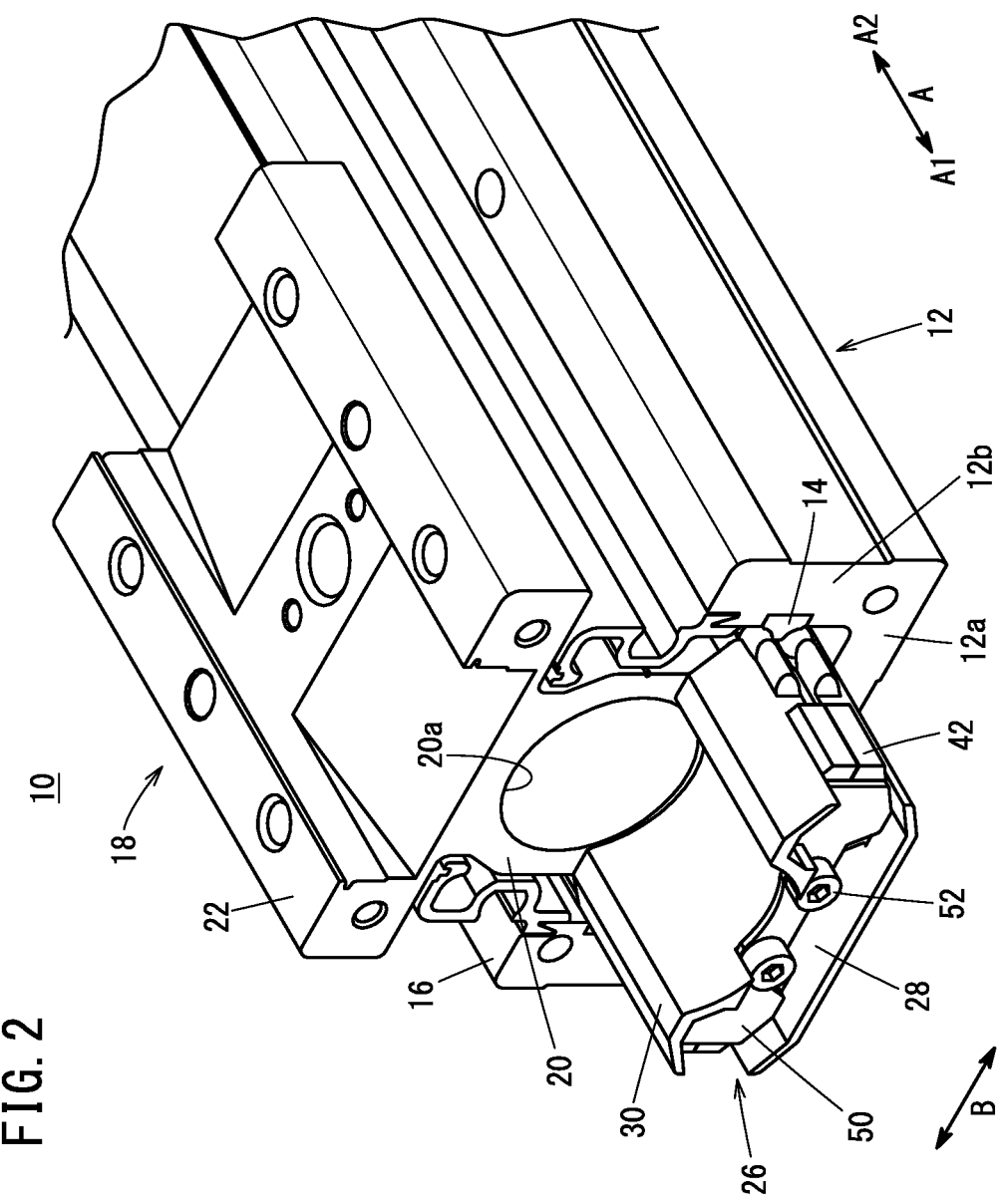
FIG. 2 is an external view of the linear guide shown in FIG. 1.
Figure 3:
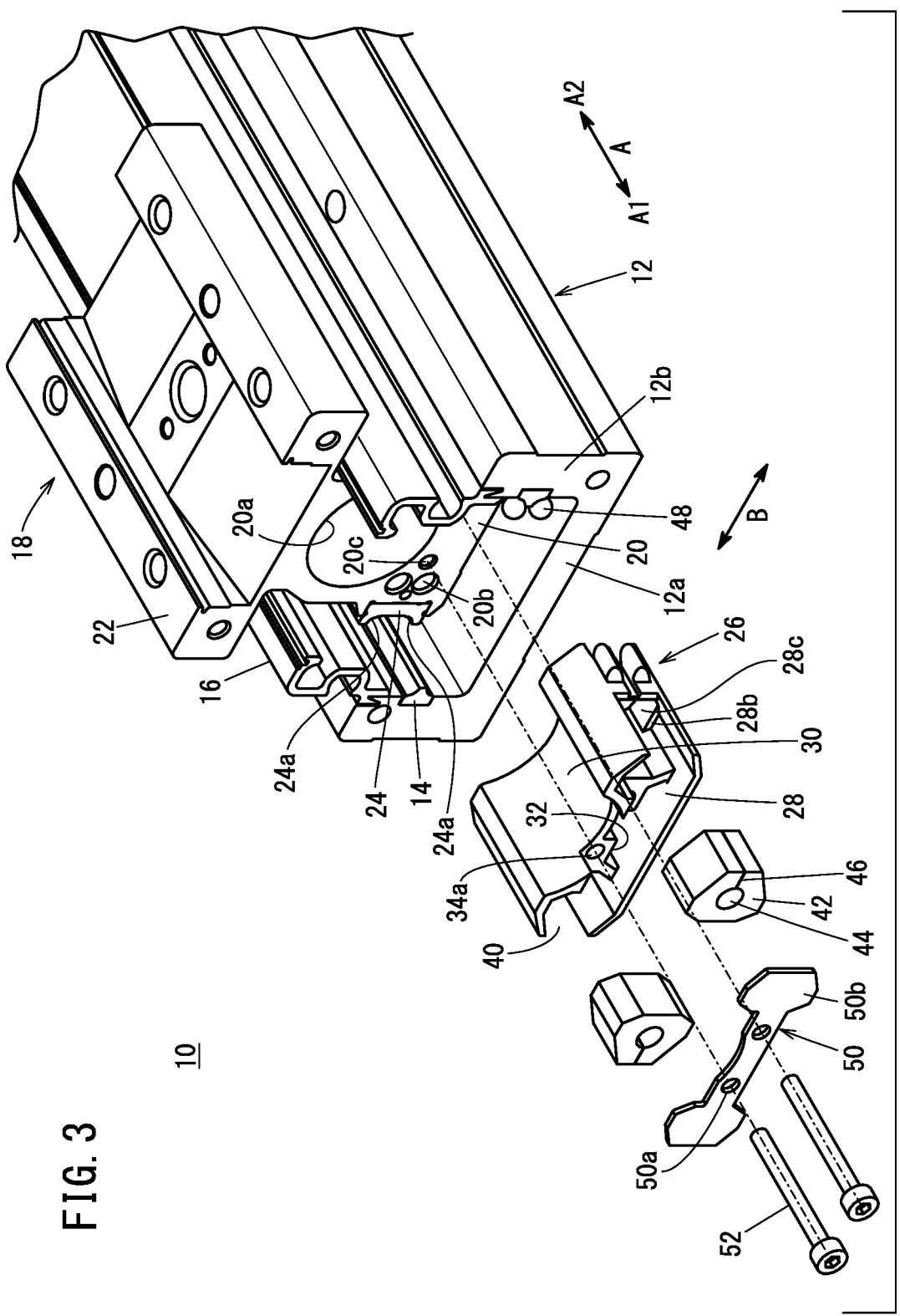
FIG. 3 is an exploded view of a part of the linear guide shown in FIG. 1.

As shown in FIGS. 1 to 3, the slider 18 includes a rectangular parallelepiped slider main body 20, a table portion 22 formed integrally with the slider main body 20, and a pair of return covers 26. The return cover 26 is attached to both ends of the slider main body 20 in the longitudinal direction (direction A). A workpiece can be placed on the table portion 22. Slider guide rails 24 extending in the longitudinal direction of the slider main body 20 are attached to both side surfaces of the slider main body 20. The slider main body 20 has a hole portion 20*a* penetrating in the longitudinal direction. A drive member (not shown) such as a ball screw for driving the slider 18 is coupled to the hole portion 20*a*.

Each slider guide rail 24 includes a pair of transfer surfaces 24*a* arranged in the up-down direction. A ball 48 can roll on the transfer surfaces 24*a*. The slider main body 20 internally has a ball circulation path 20*b* having a linear track at a position corresponding to the transfer surface 24*a*. That is, the slider main body 20 has a total of four linear ball circulation paths 20*b* in the vertical and horizontal directions.

The body 12 is a member having a U-shaped cross section that opens upward, and has a bottom wall portion 12*a* and a pair of side wall portions 12*b*. A body guide rail 14 extending in the longitudinal direction (direction A) of the body 12 is attached to the inner side surface of each side wall portion 12b. The body guide rail 14 is provided with a convex portion 14a projecting toward the slider guide rail 24 over the entire length. Transfer surfaces 14b on which the balls 48 can roll are formed above and below the convex portion 14a. The transfer surface 14b faces the transfer surface 24a of the slider guide rail 24. A side cover 16 covering a side surface of the slider main body 20 is attached to each side wall portion 12b of the body 12.

The return cover 26 includes a flat plate-shaped lower plate portion 28, an upper plate portion 30 having a curved surface 30a curved downward, and a pair of connecting wall portions 32 connecting the upper plate portion 30 to the lower plate portion 28. The curved surface 30a of the upper plate portion 30 has a shape matching the hole portion 20a of the slider main body 20. Note that the pair of return covers 26 have the same structure.

Figure 4:
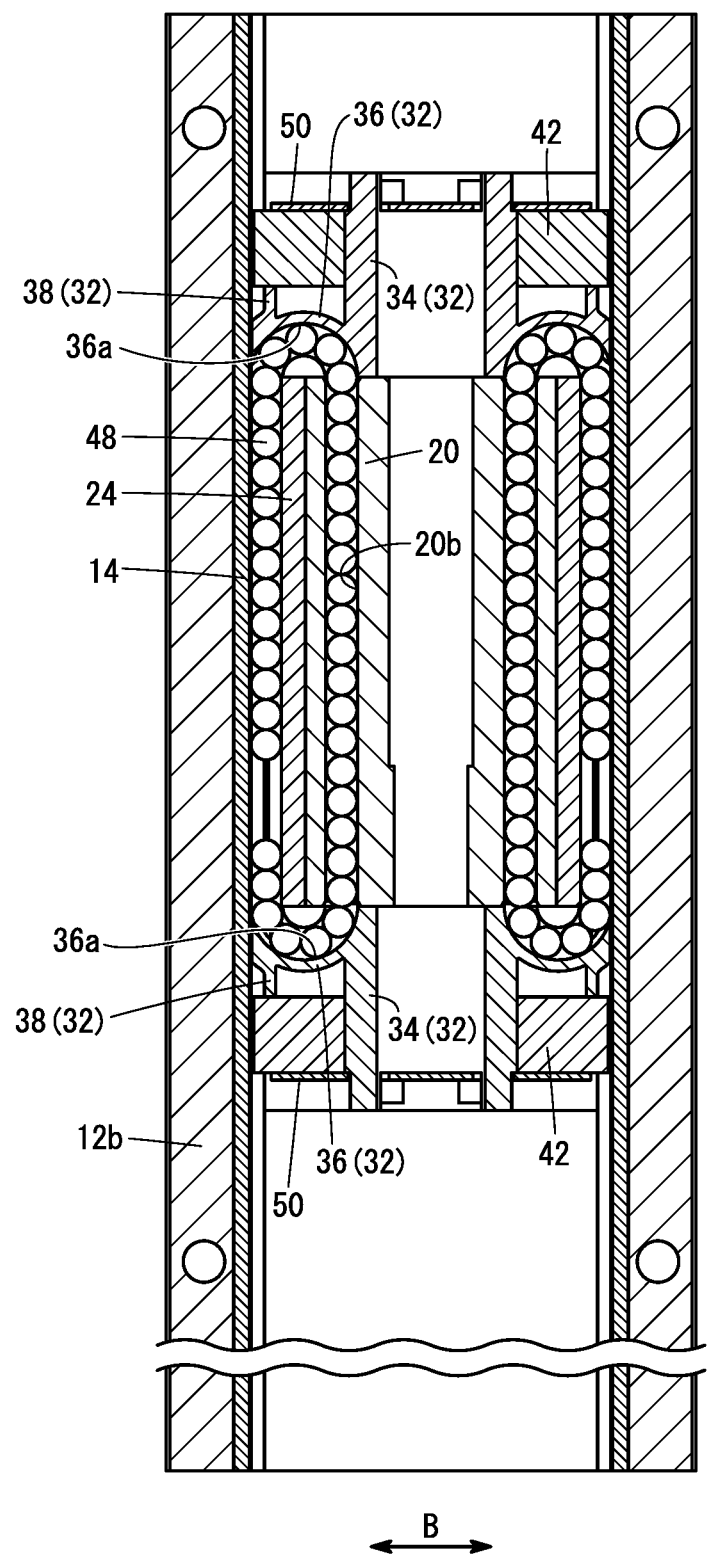
FIG. 4 is a cross-sectional view taken along a line IV-IV of the linear guide of FIG. 1.
Figure 5:
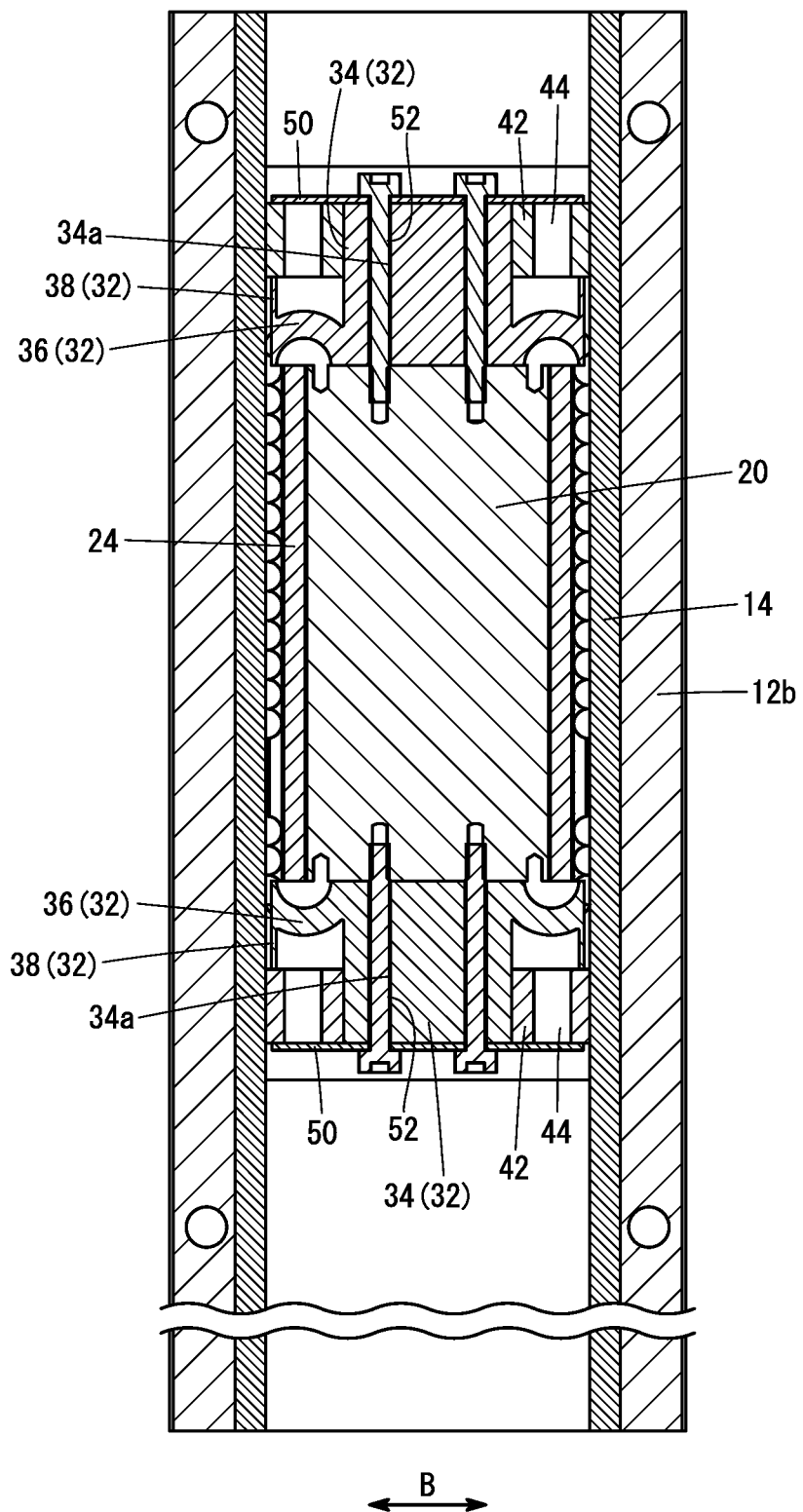
FIG. 5 is a cross-sectional view taken along a line V-V of the linear guide of FIG. 1.

As shown in FIGS. 4 and 5, the connecting wall portion 32 includes a first wall portion 34, a second wall portion 36, and a third wall portion 38. The first wall portion 34 extends parallel to the longitudinal direction of the slider main body 20. The second wall portion 36 extends in the width direction (direction B) of the return cover 26 from an end portion of the first wall portion 34. The third wall portion 38 is folded back from an end portion of the second wall portion 36 and extends parallel to the first wall portion 34. As shown in FIG. 3, the lower plate portion 28 has a step surface 28c passing through a step portion 28b in a region surrounded by the first wall portion 34, the second wall portion 36, and the third wall portion 38.

The second wall portion 36 of the connecting wall portion 32 includes a ball circulation path 36a. One end of the ball circulation path 36a is connected to the ball circulation path 20b of the slider main body 20. The other end of the ball circulation path 36a faces an end portion of the slider guide rail 24. The ball circulation path 36a has a semi-circular track. That is, the second wall portion 36 includes a total of four semi-circular ball circulation paths 36a in the vertical and horizontal directions.

The lower plate portion 28 has bent portions 28a bent obliquely upward at both end portions in the widthwise direction (direction B). The upper plate portion 30 has bent portions 30b bent in a mountain shape at both end portions in the widthwise direction. An end portion of each bent portion 30b of the upper plate portion 30 faces an end portion of each bent portion 28a of the lower plate portion 28 with a predetermined clearance therebetween. Thus, opening portions 40 are formed in both side surfaces of the return cover 26.

The return cover 26 is attached to the slider main body 20 by a pair of attachment bolts 52. Specifically, a pressing plate 50 is disposed outside the return cover 26. The pair of attachment bolts 52 are inserted through bolt insertion holes 50a of the pressing plate 50 and bolt insertion holes 34a of the first wall portion 34 of the return cover 26, and are screwed into bolt mounting holes 20c of the slider main body 20 (see FIG. 3).

The plurality of balls 48 are arranged in two rows in the up-down direction between each body guide rail 14 and each slider guide rail 24. As the slider 18 moves, the plurality of balls 48 roll on the transfer surface 14b of the body guide rail 14 and the transfer surface 24a of the slider guide rail 24. The plurality of balls 48 move in the ball circulation path 20b of the slider main body 20 and in the ball circulation path 36a of the pair of return covers 26.

Figure 6:
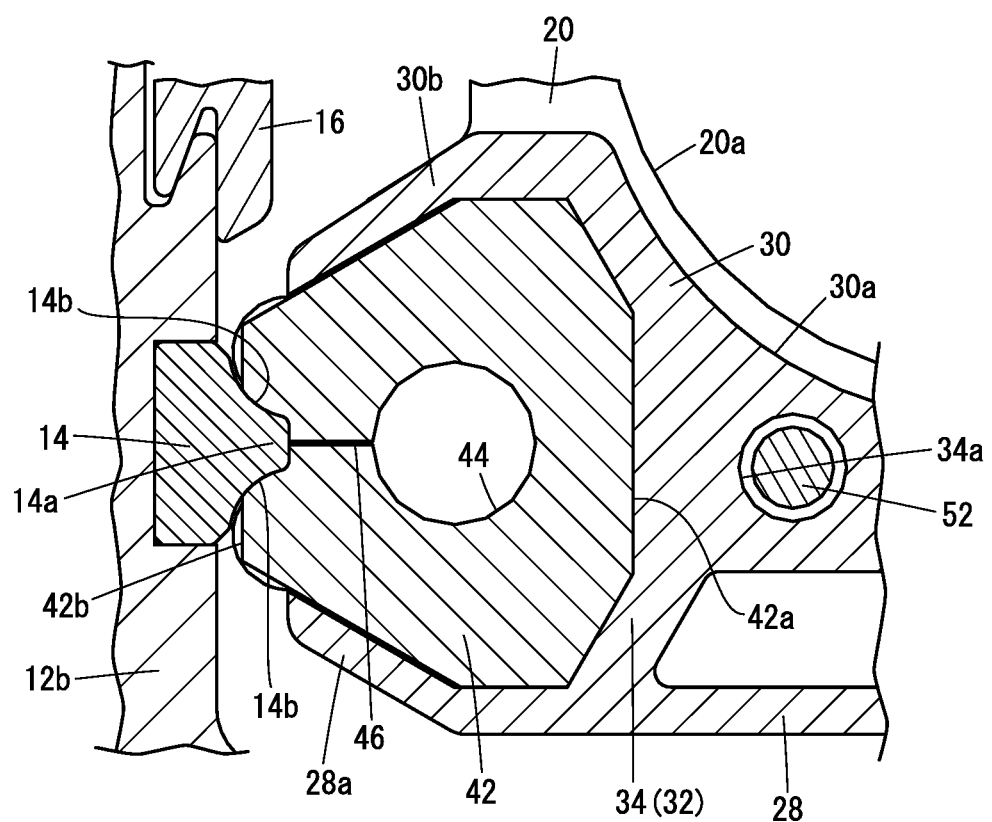
FIG. 6 is a partial cross-sectional view of the linear guide of FIG. 1 including a retainer.

As shown in FIGS. 3 and 6, a polygonal columnar lubricant retainer 42 is disposed between each bent portion 28a of the lower plate portion 28 of the return cover 26 and each bent portion 30b of the upper plate portion 30. The lubricant retainer 42 is made up from a porous elastic body impregnated with lubricant such as grease.

An inner side surface 42a of the lubricant retainer 42 abuts against a side surface of the first wall portion 34. One axial end surface (A1-direction end surface) of the lubricant retainer 42 abuts against an ear 50b formed at an end portion of the pressing plate 50. The other axial end surface (A2-direction end surface) of the lubricant retainer 42 abuts against the step portion 28b of the lower plate portion 28 and an end portion of the third wall portion 38. That is, the lubricant retainer 42 is positioned and supported by the lower plate portion 28, the upper plate portion 30, the connecting wall portion 32, and the pressing plate 50.

The lubricant retainer 42 includes a lubricant storage hole (lubricant storage space) 44 having a circular cross section. The lubricant storage hole 44 passes through the lubricant retainer 42 in the axial direction. The lubricant retainer 42 is provided with a slit 46 formed so as to be connected to the lubricant storage hole 44 by its generating line. The slit 46 extends horizontally in a planar shape. The lubricant storage hole 44 is filled with lubricant (lubricating oil) such as grease. The slit 46 opens at an outer side surface 42b and at both end surfaces in the axial direction of the lubricant retainer 42.

The outer side surface 42b of the lubricant retainer 42 protrudes from the opening portion 40 portion of the return cover 26 toward the body guide rail 14. The convex portion 14a of the body guide rail 14 elastically deforms the lubricant retainer 42 so as to push open the slit 46 of the lubricant retainer 42, and is inserted into the slit 46 from the outer side surface 42b of the lubricant retainer 42. One axial end side (A1-direction end portion) of the lubricant storage hole 44 is closed by the pressing plate 50.

The lubricant retainer 42 is in sliding contact with the body guide rail 14 at the outer side surface 42b including the slit 46. With the movement of the slider 18, the lubricant retainer 42 is brought into contact with the transfer surface 14b of the body guide rail 14 at various positions in the longitudinal direction, and the lubricant impregnated in the lubricant retainer 42 is uniformly supplied to the transfer surface 14b of the body guide rail 14. Since the lubricant storage hole 44 is filled with a predetermined amount of lubricant, a state in which the lubricant retainer 42 is impregnated with a constant amount of lubricant is maintained over a long period of time.

When an excessive amount of lubricant is supplied to the body guide rail 14, the lubricant is sucked by the lubricant retainer 42 as the slider 18 moves. Therefore, the lubricant does not leak to the outside of the linear guide 10. Further, when foreign matter such as dust adheres to the body guide rail 14, the lubricant retainer 42 guides the foreign matter to the outside of the linear guide 10 with the movement of the slider 18. Thus, the foreign matter can be removed.

According to the linear guide 10 of the present embodiment, the lubricant retainer 42 includes therein the lubricant storage hole 44 that is filled with the lubricant. Therefore, a state in which the lubricant retainer 42 is sufficiently impregnated with the lubricant is maintained over a long period of time, and the lubricant can be continuously supplied to the guide rail 14 of the body 12.

In the present embodiment, the convex portion 14a of the body guide rail 14 is inserted into the slit 46 of the lubricant retainer 42 while elastically deforming the lubricant retainer 42. Alternatively, a recess may be formed in the lubricant retainer 42 to receive the convex portion 14a of the body guide rail 14 in the natural state of the lubricant retainer 42. In the former case, there is an advantage that manufacturing of the lubricant retainer 42 is simple, and in the latter case, there is an advantage that sliding resistance of the slider 18 is small.

Second Embodiment

Figure 7:
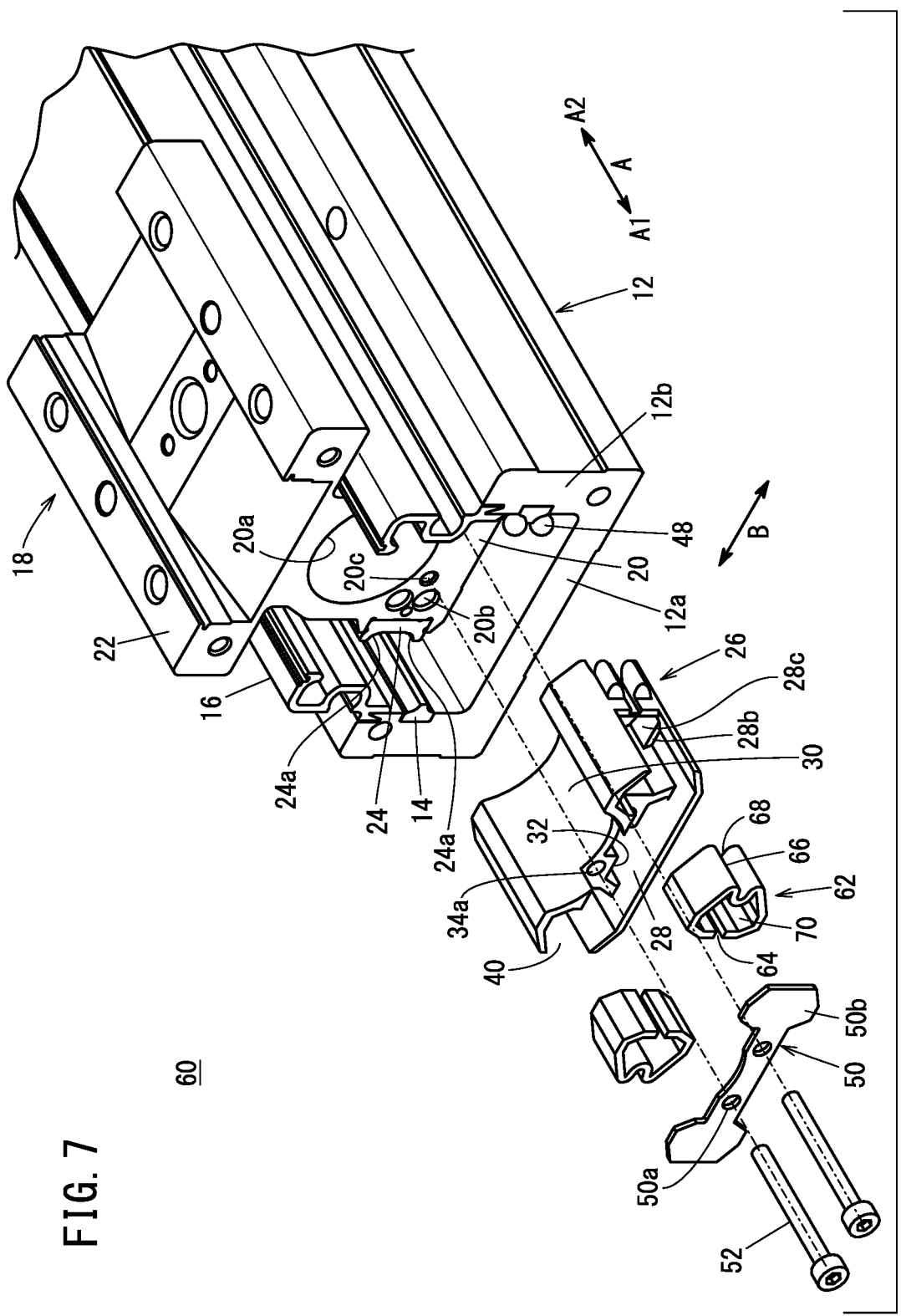
FIG. 7 is a partially developed view of a linear guide according to a second embodiment of the present invention.
Figure 8:
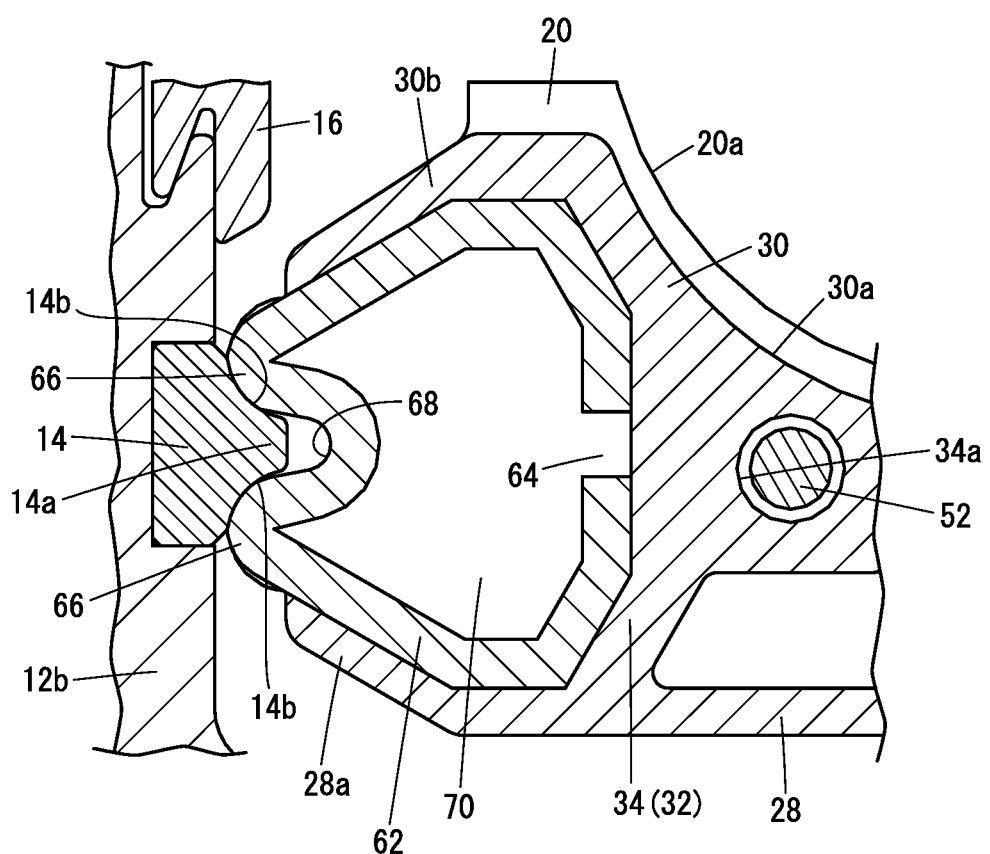
FIG. 8 is a partial cross-sectional view of the linear guide of FIG. 7 including a retainer.

Next, a linear guide 60 according to a second embodiment of the present invention will be described with reference to FIGS. 7 and 8. In the linear guide 60 according to the second embodiment, the structure of a lubricant retainer 62 is different from that of the lubricant retainer 42 of the first embodiment. The same structures as those of the linear guide 10 of the first embodiment are denoted by the same reference numerals, and detailed description thereof will be omitted.

The lubricant retainer 62 is made of a porous elastic body impregnated with lubricant such as grease, and is a member formed in a thin-film cylindrical shape having a uniform thickness. One side surface of the lubricant retainer 62 is provided with a slit-like notch 64 extending in the horizontal direction. The other side surface of the lubricant retainer 62 includes two ridge portions 66 extending in the horizontal direction and a trough portion 68 formed therebetween. The lubricant retainer 62 includes a lubricant storage space 70 inside, and the lubricant storage space 70 is filled with lubricant (lubricating oil) such as grease.

The lubricant retainer 62 is disposed between the bent portion 28a of the lower plate portion 28 of the return cover 26 and the bent portion 30b of the upper plate portion 30. One side surface of the lubricant retainer 62 abuts against a side surface of the first wall portion 34 of the return cover 26. One of the opening end portions (A1-direction end portion) of the lubricant retainer 62 abuts on the ear 50b of the pressing plate 50. The other opening end portion (A2-direction end portion) of the lubricant retainer 62 abuts against the step portion 28b of the lower plate portion 28 of the return cover 26 and an end portion of the third wall portion 38. That is, the lubricant retainer 62 is positioned and supported by the lower plate portion 28, the upper plate portion 30, the connecting wall portion 32, and the pressing plate 50.

The two ridge portions 66 of the lubricant retainer 62 protrude from the opening portion 40 of the return cover 26 toward the body guide rail 14. The convex portion 14a of the body guide rail 14 is inserted into the trough portion 68 of the lubricant retainer 62. An end portion of the lubricant storage space 70 in the A1 direction is closed by the pressing plate 50.

The lubricant retainer 62 is brought into sliding contact with the transfer surface 14b of the body guide rail 14 at two ridge portions 66. As the slider 18 moves, the lubricant retainer 62 comes into contact with the transfer surface 14b of the body guide rail 14 at various positions in the longitudinal direction, and the lubricant impregnated in the lubricant retainer 62 is uniformly supplied to the transfer surface 14b of the body guide rail 14. Since the lubricant storage space 70 is filled with a predetermined amount of lubricant, a state in which the lubricant retainer 62 is impregnated with a constant amount of lubricant is maintained over a long period of time.

According to the linear guide 60 of the present embodiment, the lubricant retainer 62 includes therein the lubricant storage space 70 filled with lubricant. Therefore, a state in which the lubricant retainer 62 is sufficiently impregnated with lubricant is maintained over a long period of time, and lubricant can be continuously supplied to the guide rail 14 of the body 12. Further, since the lubricant retainer 62 is formed in a thin-film cylindrical shape, the volume of the lubricant storage space 70 provided inside the lubricant retainer 62 can be increased as much as possible, and the filling amount of lubricant can be increased as much as possible.

The present invention is not limited to the embodiment described above, and various configurations may be adopted therein without deviating from the essence and gist of the invention.

What is claimed is:

1. A linear guide comprising a plurality of balls arranged between a guide rail of a body and a guide rail of a slider; a return cover including a ball circulation path, the return cover attached to the slider; a lubricant retainer being made up from a porous elastic body, being in a sliding contact with the guide rail of the body, being supported by the return cover, and being equipped with a lubricant storage space filled only with lubricant, wherein
   the lubricant retainer has a polygonal columnar shape, and
   the lubricant storage space is configured as a lubricant storage hole penetrating the entire length of the lubricant retainer in an axial direction of the lubricant retainer.

2. The linear guide according to claim 1, wherein the lubricant storage space has a circular cross section.

3. The linear guide according to claim 1, wherein an outer side surface of the lubricant retainer protrudes from an opening portion provided in the return cover toward the guide rail of the body.

4. The linear guide according to claim 3, wherein the lubricant retainer is provided with a slit formed so as to be connected to the lubricant storage hole by a generating line of the lubricant storage hole, and a convex portion provided on the guide rail of the body is inserted into the slit.

5. A linear guide comprising a plurality of balls arranged between a guide rail of a body and a guide ail of a slider; a return cover including a ball circulation path, the return cover attached to the slider; and a lubricant retainer being made up from a porous elastic body, being in a sliding contact with the guide rail of the body, being supported by the return cover, and being equipped with a lubricant storage space filled with lubricant, wherein
   the lubricant retainer is a tubular member having a uniform thickness.

6. The linear guide according to claim 5, wherein a side face of the lubricant retainer is provided with two ridge portions and a trough portion formed between the two ridge portions, and the two ridge portions project toward the guide rail of the body from an opening portion provided in the return cover.

7. The linear guide according to claim 6, wherein a convex portion provided on the guide rail of the body is inserted into the trough portion.

* * * * *